United States Patent [19]

[11] 3,784,937

Jackson et al.

[45] Jan. 8, 1974

[54] BLOCKING CAPACITOR FOR A THIN-FILM RF TRANSMISSION LINE

[75] Inventors: Weldon H. Jackson, Sunnyvale; John C. Lamy, Palo Alto, both of Calif.

[73] Assignee: Hewlett-Packard Company, Palo Alto, Calif.

[22] Filed: Oct. 25, 1972

[21] Appl. No.: 300,634

[52] U.S. Cl. .......... 333/84 M, 333/24 C
[51] Int. Cl. .......... H01p 5/02, H01p 3/08
[58] Field of Search .......... 333/24 C, 84 M

[56] References Cited

UNITED STATES PATENTS

| | | | |
|---|---|---|---|
| 3,310,760 | 3/1967 | Swan | 333/24 C |
| 3,560,893 | 2/1971 | Wen | 333/84 M |

OTHER PUBLICATIONS

Caulton et al., "Microwave Integrated–Circuit Technology, A Survey," IEEE Jr. of Solid State Circuits, Vol. SC–5, 12–1970, pp. 292–295

*Primary Examiner*—James W. Lawrence
*Assistant Examiner*—Wm. H. Punter
*Attorney*—Patrick J. Barrett

[57] ABSTRACT

A blocking capacitor is formed in the center conductor of a thin-film RF transmission line which is situated over a metal conductor and insulated from the center conductor and outer conductors of the transmission line. The distributed capacitor so formed couples RF signals over a broad frequency range while blocking DC and very low frequency signals on the transmission line.

2 Claims, 7 Drawing Figures

BLOCKING CAPACITOR FOR A THIN-FILM RF TRANSMISSION LINE

BACKGROUND AND SUMMARY OF THE INVENTION

RF transmission lines are sometimes used to carry DC or low frequency signals as well as radio frequency (RF) signals and it is often desirable to isolate certain portions of an RF circuit from these low frequency or DC signals. A blocking capacitor is commonly inserted in series with an RF transmission line which is connected to circuits requiring isolation from DC or very low frequency signals. Such capacitors, however, can introduce discontinuities in the transmission lines and increase the standing wave ratio (SWR) of the transmission line. In order to minimize the SWR the capacitor should appear, electrically, as part of the transmission line at high frequencies. This has been accomplished in coaxial transmission lines, for example, by placing a small, discrete capacitor in the center conductor of the coaxial transmission line. It has proved more difficult, however, to place blocking capacitors in the center conductor of a thin-film microcircuit transmission line. When a discrete capacitor is attached to the center conductor of a microcircuit it produces a marked discontinuity, increasing the SWR of the transmission line at high frequencies.

In the present invention, a distributed, rather than a lumped capacitor, is formed in the transmission line itself such that the effective capacitance varies as a function of the frequency of the signal being carried on the transmission line. This feature makes the distributed capacitor an ideal coupling device for a broadband transmission line since higher frequency signals require less coupling capacitance than low frequency signals; and because very high frequency signals usually flow in only a portion of the transmission line, only a portion of the coupling capacitor is used at very high frequencies. As the signal frequency gets lower, the signal is carried in a greater portion of the center conductor and flows through a greater portion of the capacitor, thus increasing the amount of capacitance presented to the signal. In addition, the thickness of the capacitor is very small compared with the dimensions of the transmission line so that the RF signal remains essentially in the same plane as it flows through the capacitor. In contrast, a discrete capacitor usually introduces discontinuities into the transmission line both because of its significant height above the line and because it is usually not the same width as the center conductor. The blocking capacitor of the present invention is also better adapted to thin-film processing than discrete capacitors because no separate bonding operation is necessary to attach the capacitor to the transmission line.

DESCRIPTION OF THE PREFERRED EMBODIMENT

Figure 1:
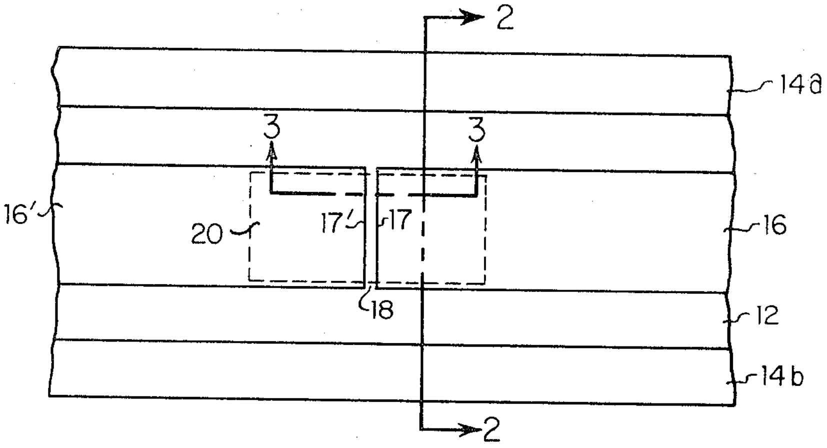
FIG. 1 shows a preferred embodiment of the present invention.
Figure 2:
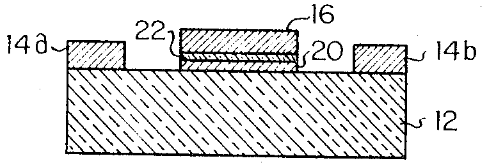
FIG. 2 shows a cross-sectional view of FIG. 1.
Figure 3:
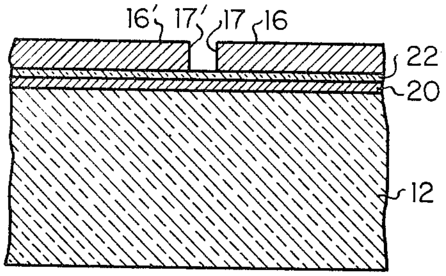
FIG. 3 shows another cross-sectional view of FIG. 1.

FIGS. 1, 2 and 3 show a thin-film RF transmission line constructed on an insulating substrate 12. The transmission line, having characteristic impedance of 50 ohms for example, comprises two ground or outer conductors 14*a* and 14*b* and a signal or center conductor 16. The center conductor is formed in two portions, 16 and 16', to form a gap 18 which blocks the flow of direct current and very low frequency signals along the center conductor. To form a coupling capacitor between the two portions of the center conductor, a metal layer 20 is placed below the center conductor in the region of the gap, with a dielectric layer 22 between the center conductor and the metal layer. This capacitor is actually two series connected capacitors. One is formed between center conductor 16 and metal layer 20; and the other, between center conductor 16' and metal layer 20, with the metal layer connecting the two capacitors.

At very high frequencies the RF current tends to flow along the outer edges of the center conductor, so that only the outer portions of the capacitor are used. In addition, the current only flows through dielectric 22 near end portions 17 and 17' of center conductors 16 and 16'. As the frequency of the signal on the transmission line gets lower, the RF current flows in a greater portion of the center conductor. Also, with decreasing frequency, the signal flows through portions of dielectric 22 farther from gap 18, and thus through more of metal layer 20, until signal current is flowing through the whole capacitor. Thus, as greater coupling is needed with decreased frequency it is available as more of the distributed coupling capacitor is used. The capacitance of gap 18 appears in parallel across the two series connected capacitors, although the capacitance of gap 18 is significantly lower than that of the series connected capacitors. The difference in capacitance is due in part to the fact that the thickness of dielectric 22 is very much smaller than the width of the gap, typically 0.5 microns versus 50 microns. In addition, the extreme thickness of dielectric 22, along with the thinness of metal layer 20, typically 0.6 microns, keeps the vertical dimensions of the capacitor insignificant in comparison with the thickness of conductors 14 and 16 and the lateral dimensions of the transmission line in order to minimize the SWR.

Figure 4:
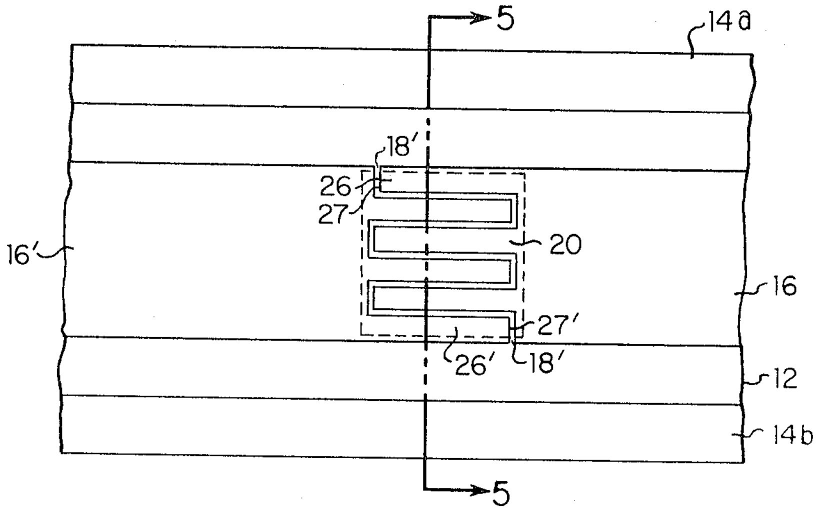
FIG. 4 shows a plan view of another preferred embodiment of the present invention.
Figure 5:
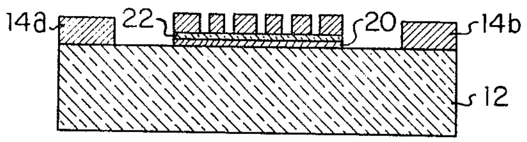
FIG. 5 shows a cross-sectional view of FIG. 4.

A lower loss capacitor can be constructed using an interdigital structure as shown in FIGS. 4 and 5. Because of processing considerations, discussed below, it is often convenient to use a material for metal layer 20 which has a higher resistivity than the outer conductor. An interdigital structure minimizes the losses in the metal layer by keeping the current paths short through that material at all frequencies. At very high frequencies, the signal current only flows in the extremities of the center conductors as discussed above, and it flows through the dielectric to the metal layer only through the tips 27 and 27' of the fingers 26 and 26'. As the frequency of the signal gets lower, current flows through more of the fingers and through a greater portion of each finger. However, because each finger on center conductor 16 is immediately adjacent a finger of center conductor 16', the current does not have to flow very far through metal layer 20, even at lower frequencies. Just as with the device shown in FIGS. 1 – 3, the capacitance of the interdigital capacitor increases with decreasing signal frequency to provide the proper coupling at all frequencies.

Figure 6:
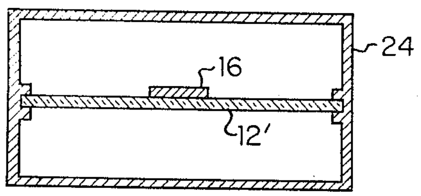
FIG. 6 shows a cross-sectional view of still another preferred embodiment.
Figure 7:
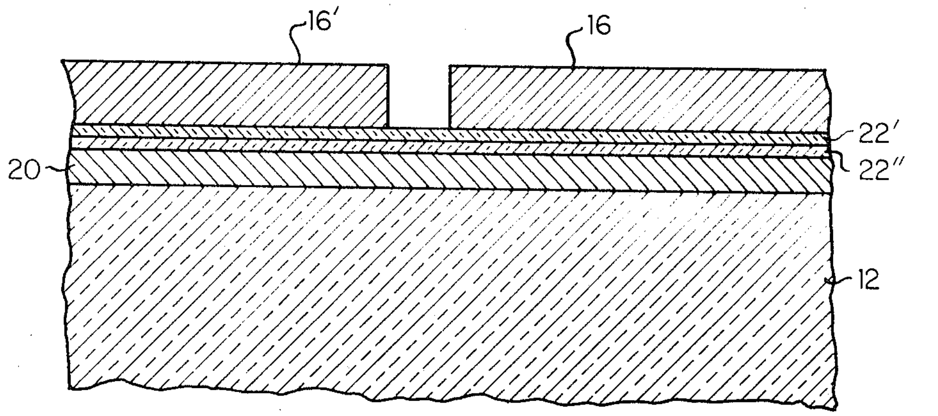
FIG. 7 shows a cross-sectional view of a preferred embodiment of the present invention with a dual dielectric.

The value of the coupling capacitor along with the ease of fabrication, may be increased even more by using a dual dielectric layer for dielectric 22 shown in FIG. 7 as layers 22' and 22''. If metal 20 is tantalum, a portion 22'' of that tantalum may be oxidized after the tantalum is applied to substrate 12; and a dielectric 22' such as silicon oxide or aluminum oxide can then be applied on top of the tantalum oxide to provide the dual dielectric. Center conductor 16 can then be applied on top of the second dielectric layer. Although the coupling capacitor has been illustrated in a transmission line having outer conductors symmetrically disposed about the center conductor, the invention can also be used in strip lines having a ground plane lying underneath the center conductor. In addition, other commonly used thin-film RF transmission line structures can be used. For example, as shown in FIG. 6, a substrate 12'' supporting only the center conductor 16, including the blocking capacitor, can be placed in a conductive structure 24, which provides a ground conductor for the transmission line.

We claim:

1. A radio frequency transmission line having a blocking capacitor comprising:

an insulative substrate;

a ground conductor maintained in a fixed spatial relationship to the substrate;

a conductive layer deposited on a first portion of the substrate;

an insulative layer deposited over the conductive layer; and a signal conductor having a first and second segment deposited on a second portion of the substrate and on the insulative layer, with a gap between the first and second segment of the signal conductor forming an interdigital pattern over the conductive layer, the ground and signal conductors being substantially parallel in the region of the conductive layer to form a radio frequency transmission line having a constant characteristic impedance and being adapted to carry radio frequency signals.

2. A radio frequency transmission line as in claim 1 wherein the insulative layer comprises two different dielectric layers.

* * * * *